United States Patent
Vanbesien et al.

(10) Patent No.: US 8,252,494 B2
(45) Date of Patent: Aug. 28, 2012

(54) FLUORESCENT TONER COMPOSITIONS AND FLUORESCENT PIGMENTS

(75) Inventors: Daryl W. Vanbesien, Burlington (CA); Maria M. Birau, Mississauga (CA); C. Geoffrey Allen, Waterdown (CA); Carol A. Jennings, Etobicoke County (CA); Peter G. Odell, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 14 days.

(21) Appl. No.: 12/772,689

(22) Filed: May 3, 2010

(65) Prior Publication Data

US 2011/0269065 A1  Nov. 3, 2011

(51) Int. Cl.
  *G03G 9/09* (2006.01)
(52) U.S. Cl. ............... 430/108.4; 430/108.1; 430/108.2; 430/108.21; 106/272; 106/493; 106/498
(58) Field of Classification Search ............... 430/108.4, 430/108.21, 108.2, 108.1; 106/31.15, 31.24, 106/31.64, 31.61, 272, 493, 498, 502, 506; 252/301.16, 301.34
See application file for complete search history.

(56) References Cited

U.S. PATENT DOCUMENTS

| | | |
|---|---|---|
| 5,278,020 A | 1/1994 | Grushkin et al. |
| 5,290,654 A | 3/1994 | Sacripante et al. |
| 5,308,734 A | 5/1994 | Sacripante et al. |
| 5,344,738 A | 9/1994 | Kmiecik-Lawrynowicz et al. |
| 5,346,797 A | 9/1994 | Kmiecik-Lawrynowicz et al. |
| 5,348,832 A | 9/1994 | Sacripante et al. |
| 5,364,729 A | 11/1994 | Kmiecik-Lawrynowicz et al. |
| 5,366,841 A | 11/1994 | Patel et al. |
| 5,370,963 A | 12/1994 | Patel et al. |
| 5,403,693 A | 4/1995 | Patel et al. |
| 5,405,728 A | 4/1995 | Hopper et al. |
| 5,418,108 A | 5/1995 | Kmiecik-Lawrynowicz et al. |
| 5,496,676 A | 3/1996 | Croucher et al. |
| 5,501,935 A | 3/1996 | Patel et al. |
| 5,527,658 A | 6/1996 | Hopper et al. |
| 5,585,215 A | 12/1996 | Ong et al. |
| 5,650,255 A | 7/1997 | Ng et al. |

(Continued)

FOREIGN PATENT DOCUMENTS

GB  1 442 835  7/1976

OTHER PUBLICATIONS

"Dimer Acids," Kirk-Othmer Encyclopedia of Chemical Technology, vol. 8, 4th Ed. (1992), pp. 223-237.

(Continued)

*Primary Examiner* — Janis L Dote
(74) *Attorney, Agent, or Firm* — Oliff & Berridge, PLC

(57) ABSTRACT

A fluorescent particle includes a fluorescent pigment, such as a trans-dicarboxylic-indenofluorenone, and at least one stabilizing wax chemically attached to the fluorescent pigment. The stabilizing wax includes an amine group at its terminal end and the fluorescent pigment includes at least one carboxylic acid group, where the amine group reacts with the carboxylic acid group to form an amide bond. A method for making fluorescent particles for use in toners by chemically attaching at least one stabilizing wax to a fluorescent pigment where the at least one stabilizing wax includes an amine group at its terminal end and the fluorescent pigment includes at least one carboxylic acid group. A toner may include a resin and the fluorescent particle.

15 Claims, 3 Drawing Sheets

U.S. PATENT DOCUMENTS

| | | | |
|---|---|---|---|
| 5,650,256 | A | 7/1997 | Veregin et al. |
| 5,723,253 | A | 3/1998 | Higashino et al. |
| 5,744,520 | A | 4/1998 | Kmiecik-Lawrynowicz et al. |
| 5,747,215 | A | 5/1998 | Ong et al. |
| 5,763,133 | A | 6/1998 | Ong et al. |
| 5,766,818 | A | 6/1998 | Smith et al. |
| 5,804,349 | A | 9/1998 | Ong et al. |
| 5,827,633 | A | 10/1998 | Ong et al. |
| 5,840,462 | A | 11/1998 | Foucher et al. |
| 5,853,944 | A | 12/1998 | Foucher et al. |
| 5,863,698 | A | 1/1999 | Patel et al. |
| 5,869,215 | A | 2/1999 | Ong et al. |
| 5,902,710 | A | 5/1999 | Ong et al. |
| 5,910,387 | A | 6/1999 | Mychajlowskij et al. |
| 5,916,725 | A | 6/1999 | Patel et al. |
| 5,919,595 | A | 7/1999 | Mychajlowskij et al. |
| 5,925,488 | A | 7/1999 | Patel et al. |
| 5,977,210 | A | 11/1999 | Patel et al. |
| 6,063,827 | A | 5/2000 | Sacripante et al. |
| 6,576,389 | B2 | 6/2003 | Vanbesien et al. |
| 6,593,049 | B1 | 7/2003 | Veregin et al. |
| 6,617,092 | B1 | 9/2003 | Patel et al. |
| 6,627,373 | B1 | 9/2003 | Patel et al. |
| 6,638,677 | B2 | 10/2003 | Patel et al. |
| 6,656,657 | B2 | 12/2003 | Patel et al. |
| 6,656,658 | B2 | 12/2003 | Patel et al. |
| 6,664,017 | B1 | 12/2003 | Patel et al. |
| 6,673,505 | B2 | 1/2004 | Jiang et al. |
| 6,756,176 | B2 | 6/2004 | Stegamat et al. |
| 6,770,687 | B1 * | 8/2004 | Tan et al. ............... 523/161 |
| 6,830,860 | B2 | 12/2004 | Sacripante et al. |
| 7,560,505 | B2 | 7/2009 | Agur et al. |
| 2002/0098435 | A1 * | 7/2002 | Rohr et al. ............ 430/108.22 |
| 2004/0241424 | A1 * | 12/2004 | Barbera-Guillem ......... 428/326 |
| 2006/0222991 | A1 | 10/2006 | Sacripante et al. |
| 2008/0199797 | A1 | 8/2008 | Sacripante et al. |
| 2010/0086867 | A1 * | 4/2010 | Iftime et al. ............ 430/108.4 |

OTHER PUBLICATIONS

U.S. Appl. No. 12/246,120, filed Oct. 6, 2008, to Birau et al.
U.S. Appl. No. 12/467,692, filed May 18, 2009, to Goredema et al.
U.S. Appl. No. 12/056,337, filed Mar. 27, 2008, to Nosella et al.

* cited by examiner

FLUORESCENT TONER COMPOSITIONS AND FLUORESCENT PIGMENTS

TECHNICAL FIELD

The present disclosure is generally directed to toner compositions and, more specifically, toner compositions having fluorescent particles, which may be useful for document security.

RELATED APPLICATIONS

U.S. patent application Ser. No. 12/246,120, filed Oct. 6, 2008, the disclosure of which is hereby incorporated by reference in its entirety, describes the preparation of a thioxanthene nanopigment (fluorescent yellow) using an acid pasting procedure in the presence of a "molecular dispersant." In this case, the "molecular dispersant" stabilizes the pigment by hydrogen bonding and it is not covalently attached to the pigment.

U.S. patent application Ser. No. 12/467,692, filed May 18, 2009, the disclosure of which is hereby incorporated by reference in its entirety, describes the preparation of an amide type dispersant. This type of dispersant has been successfully used to disperse magenta pigment red 57:1.

U.S. patent application Ser. No. 12/772,662, filed May 3, 2010, the disclosure of which is hereby incorporated by reference in its entirety, describes the preparation of ink compositions having fluorescent particles comprising a fluorescent pigment, and at least one stabilizing wax attached to the fluorescent pigment.

BACKGROUND

Fluorescent inks and toners may be used as an authenticating feature in the document security industry. Secure documents, for example documents that are difficult to forge, may be created using inks or toilers that include fluorescent agents either alone or in combination with ordinary inks and/or pigments. Features printed using fluorescent inks or toners are usually invisible under visible light, due to the colorless nature of the security inks or due to masking by other colorants in the document. Under ultraviolet illumination, however, the fluorescent features of the document are revealed in the form of a bright emission by the fluorescent dyes in the visible spectrum. For example, certain bank notes utilize visible features, such as holographic patches, microprinting and microtextures to conceal additional fluorescent threads and/or multi-colored emblems embedded in the bank note, which are only revealed under specific light frequencies. These features provide an increased level of security against counterfeiters by making the copying process of such a document more difficult.

The term "fluorescent dye" as used herein refers to a fluorescent material that is soluble like any other organic molecule in a vehicle and easily makes homogeneous printing compositions.

The term "fluorescent pigment" as used herein refers to a fluorescent material that is insoluble in a vehicle and requires uniform dispersion in the vehicle to use it. In most cases, the only medium available that may dissolve fluorescent pigments is a strong acid, such as concentrated sulfuric acid.

Fluorescent dyes have typically been used for fluorescent toners for xerographic and electrographic printing of security features. However, a major drawback of fluorescent dyes is that they degrade thermally. For example, the fluorescence can be lost after about 12 days of continuous heating at 125° C. This drawback is detrimental with respect to toners because the preparation of toners require high temperature for an extended time, either through conventional or chemical means, and the toner must be fused to a media at high temperature, which all have an adverse effect on the fluorescent dye. In the case of emulsion aggregation (EA) processes of preparing a toner, the fluorescent dye typically does not survive the range of pH required for toner preparation.

Generally, pigment particles are considered the better alternative because of their improved chemical, light fastening and thermal stability. They are also preferred by the industry because there is limited or no migration or bleeding of the colorant compound, which more easily occurs with dyes. Pigments may also be significantly less expensive than dyes, and so are attractive colorants for use in all printing inks.

To overcome the problems associated with fluorescent dyes described above, the security printing industry uses hard, robust pigments containing the dye of interest. These pigments are made of a hard cross-linked polymer matrix incorporating fluorescent dyes, and are dispersed in the marking vehicle, typically liquid inks. In the hard pigment particle, the dye is isolated from interaction with other materials present in the ink or toner and as a result, chemical degradation by the environment is prevented.

However, these hard pigment particles also present drawbacks. For example, mobility of the dye is severely restricted by the hard polymer matrix, which is required for any thermal degradation process. Furthermore, the incorporation of a hard polymer matrix in the toner causes undesired effects to fusing such as high minimum fusing temperature and low gloss. Also, the size of commercially available fluorescent pigments is about 3-5 microns and even higher. Given their large size, these pigments are unsuitable for fabrication of EA toners because the size of the fluorescent particles is about the size of the desired final toner particle.

SUMMARY

The present disclosure addresses these and other problems, by providing fluorescent particles stabilized by a wax, and methods for producing, and toners comprising, such fluorescent particles stabilized by a wax. By chemically attaching stabilizing groups containing waxy aliphatic chains to a fluorescent pigment, fluorescent particles are provided that have less crystalline and more softer, resin-like characteristics.

Additionally, the long aliphatic chains are compatible with toner binder and replace some or all the aliphatic wax added for oil-less fusing, thereby simplifying the design while providing fluorescent properties for fluorescent printing for security applications.

In embodiments, a fluorescent particle comprises a fluorescent pigment, and at least one stabilizing wax chemically attached to the fluorescent pigment.

In embodiments, a fluorescent particle comprises a carboxylic-indenofluorenone, and at least one alkyl chain having an amine group at its terminal end, where the amine group reacts with a carboxylic acid group of the carboxylic-indenofluorenone to form an amide bond.

In embodiments, a method for preparing fluorescent particles for use in toners comprises chemically attaching at least one stabilizing wax to a fluorescent pigment, where the at least one stabilizing wax comprises an amine group at its terminal end and the fluorescent pigment comprises at least one carboxylic acid group.

In embodiments, a toner composition comprises a resin, and a fluorescent particle, where the fluorescent particle comprises a fluorescent pigment having at least one carboxylic acid group, and a stabilizing compound having an aliphatic chain and an amine group, where the amine group reacts with the carboxylic acid group to form an amide bond.

EMBODIMENTS

Figure 1:
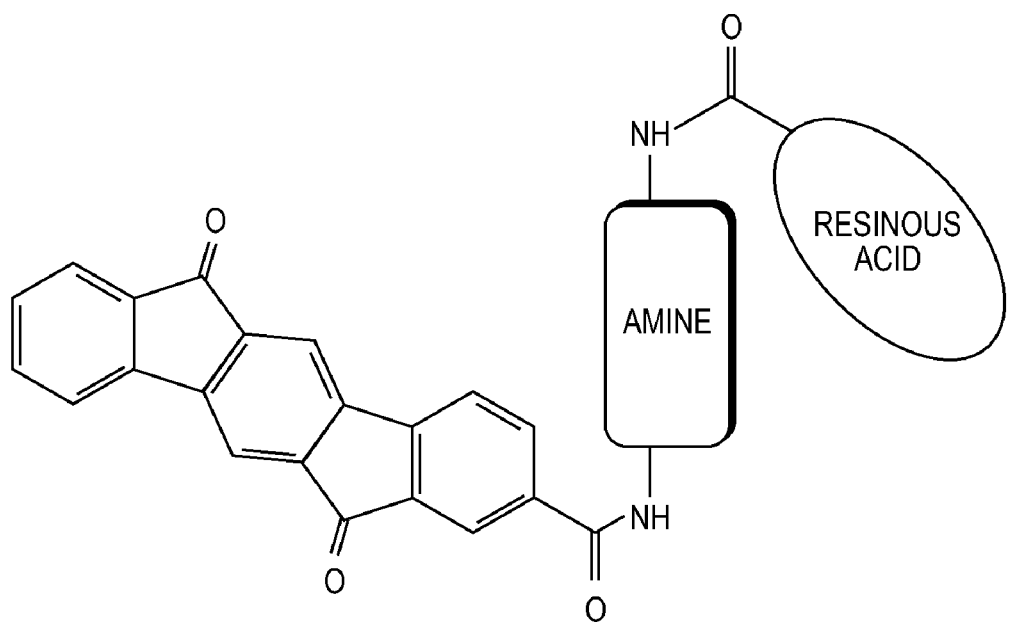
FIG. 1 depicts the generalized structure of a pigment particle comprising a monocarboxylic-indenofluorenone pigment attached to a waxy carboxylic acid and an amine.

Embodiments of the present disclosure provide fluorescent particles for use in toners, methods for producing such fluorescent particles, and toner compositions comprising such fluorescent particles for secure printing applications.

Fluorescent Particle

In embodiments, a fluorescent particle may be prepared by chemically attaching at least one stabilizing wax to a fluorescent pigment. Any fluorescent pigment known in the art that is capable of chemically attaching a stabilizing wax may be used in the present disclosure. In embodiments, the fluorescent pigment may have carboxylic acid groups on its aromatic rings such that it forms an amide bond with an amine group of the stabilizing wax. Illustrative examples of such fluorescent pigments include carboxylic-indenofluorenone, such as monocarboxylic-indenofluorenone and dicarboxylic-indenofluorenone. Other suitable fluorescent pigments include various derivatized analogs, such as rhodamines, perylenes including C.I. Pigment Orange 43 and C.I. Pigment Red 194, perinones, squaraines, and β-oxynaphthoic acid pigments such as C.I. Pigment Red 57 and C.I. Pigment Red 48.

Illustrative examples of a stabilizing wax include natural, modified natural, synthetic waxes and compounded waxes. Natural waxes may be of vegetable, animal, or mineral origin. Modified waxes are natural waxes that have been treated chemically to change their nature and properties. Synthetic waxes are made by the reaction or polymerization of chemicals. Compounded waxes are mixtures of various waxes or of waxes with resins or other compounds added thereto. These waxes may be used as is, or they may be functionalized, such as to include an amine group, to enable subsequent chemical reaction with the fluorescent pigment. The functional group may be located anywhere in the chemical structure, although such functional groups are generally terminal functional groups.

Suitable waxes may also include paraffins, olefins such as polyethylene and polypropylene, microcrystalline waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers and mixtures thereof.

In embodiments, the stabilizing wax may comprise a carboxylic acid-terminated polyethylene wax, which include mixtures of carbon chains with the structure $CH_3-(CH_2)_n-COOH$, where there is a mixture of chain lengths, n, where n is in the range of 10 to 60, where the average chain length is preferably in the range of about 16 to about 50, and linear low molecular weight polyethylene, of similar average chain length. Suitable examples of such waxes include, but are not limited to, UNICID® 350, UNICID® 425, UNICID® 550 and UNICID® 700 with $M_n$ equal to approximately 390, 475, 565 and 720 g/mol, respectively. Other suitable waxes having a structure $CH_3-(CH_2)_n-COOH$, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid with n=31, tetratriacontanoic or geddic acid with n=32, pentatriacontanoic or ceroplastic acid with n=33. Guerbet acids, characterized as 2,2-dialkyl ethanoic acids, are also suitable compounds. Suitable Guerbet acids may include, for example, those containing 16 to 36 carbons, many of which are commercially available from Jarchem Industries Inc., Newark, N.J. PRIPOL® 1009 (C-36 dimer acid mixture including isomers of the formula

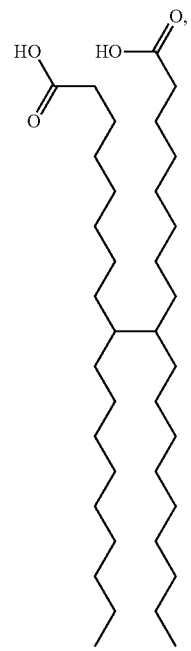

as well as other branched isomers which may include unsaturations and cyclic groups, available from Uniqema, New Castle, Del.; further information on $C_{36}$ dimer acids of this type is disclosed in, for example, "Dimer Acids," *Kirk-Othmer Encyclopedia of Chemical Technology*, Vol. 8, $4^{th}$ Ed. (1992), pp. 223 to 237, the disclosure of which is totally incorporated herein by reference) can also be used.

In embodiments, the stabilizing wax may further comprise an amine group at its terminal end. For example, the stabilizing wax may be prepared by reacting the carboxylic acid-terminated polyethylene wax with a diamine or a triamine in a molar ratio of about 1 to 1, and at temperature of about 110° C. to about 220° C., such as 180° C. Illustrative examples of such diamines include aliphatic, cyclic, or aromatic diamines and polyamines. Examples of such diamines include ethylene diamine, propylene diamine, 3,3-diamino-N-methyl-dipropylamine, 1,8-diamino-p-menthane, 1,4 diaminobutane, 1,3-diaminopentane, 1,5-diaminopentane, 1,6-diamonohexane, 1,2-diaminocyclohexane, 1,7-diaminoheptane, 1,8-diaminooctane, 1,10-diaminodecane, 4,4'-diaminobenzanilide, 4,4'-diaminobenzophenone, 2,7-diaminofluorene, 2,4-diaminotoluene, 2,3-diaminotoluene, triethylenetetramine, tetraethylenepentaamine, Ethyleneamine E-100 and tris(2-aminoethylamine).

In embodiments, the fluorescent particle may be prepared by chemically attaching the fluorescent pigment to a stabilizing wax in a high boiling solvent. The reaction can be run neat in the stabilizing wax or in high boiling solvents such as Toluene, Xylenes, 1-methyl-2-pyrrolidinone, and neat at temperatures of about 110° C. to about 220° C., such as 180° C. The reaction can proceed under an inert atmosphere such as Argon.

In embodiments, the fluorescent particle may be of a size from about 2.8 µm (2800 nm) to about 100 nm, such as about 200 nm, about 300 nm, or about 400 nm. Thus, the particle may be about 2.8 µm or less, such as 2 µm or less, about 1 µm or less, about 400 nm or less, about 300 nm or less, about 200 nm or less, or about 100 nm or less. These smaller sized pigment particles, as compared to conventional pigment particles described above, may subsequently be coalesced to achieve much smaller final toner particles, thereby providing better image quality and lower toner coverage.

Examples of fluorescent particles described above include the compounds in the table below, where each of the acids can be reacted with each of the amines.

| Indenofluorenone Pigment | Stabilizing Resin Components | | Generalized Structure |
|---|---|---|---|
| | Waxy Carboxylic Acid | Amine | |
| (structure: indenofluorenone with COOH group) | UNICID ® 700, UNICID ® 350, UNICID ® 425, UNICID ® 550, hexadecanoic acid, heptadecanoic acid, octadecanoic acid, eicosanoic acid, docosanoic acid, tetracosanoic acid, hexacosanoic acid, heptacosanoic acid, octacosanoic acid, triacontanoic acid, dotriacontanoic acid, tritriacontanoic acid tetratriacontanoic acid, pentatriacontanoic acid, Guerbet acids (16 to 36 carbons), PRIPOL ® 1009 (C-36 dimer acid mixture) | ethylene diamine, propylene diamine, 3,3-diamino-N-methyl-dipropylamine, 1,8-diamino-p-menthane, 1,4-diaminobutane, 1,3-diaminopentane, 1,5-diaminopentane, 1,6-diamonohexane, 1,2-diaminocyclohexane, 1,7-diaminoheptane, 1,8-diaminooctane, 1,10-diaminodecane, 4,4'-diaminobenzanilide, 4,4'-diaminobenzophenone, 2,7-diaminofluorene, 2,4-diaminotoulene, 2,3-diaminotoluene, triethylenetetraamine, tetraethylenepentaamine, ethyleneimine E-100, tris(2-aminoethylamine) | See FIG. 1 |

-continued

Figure 2:
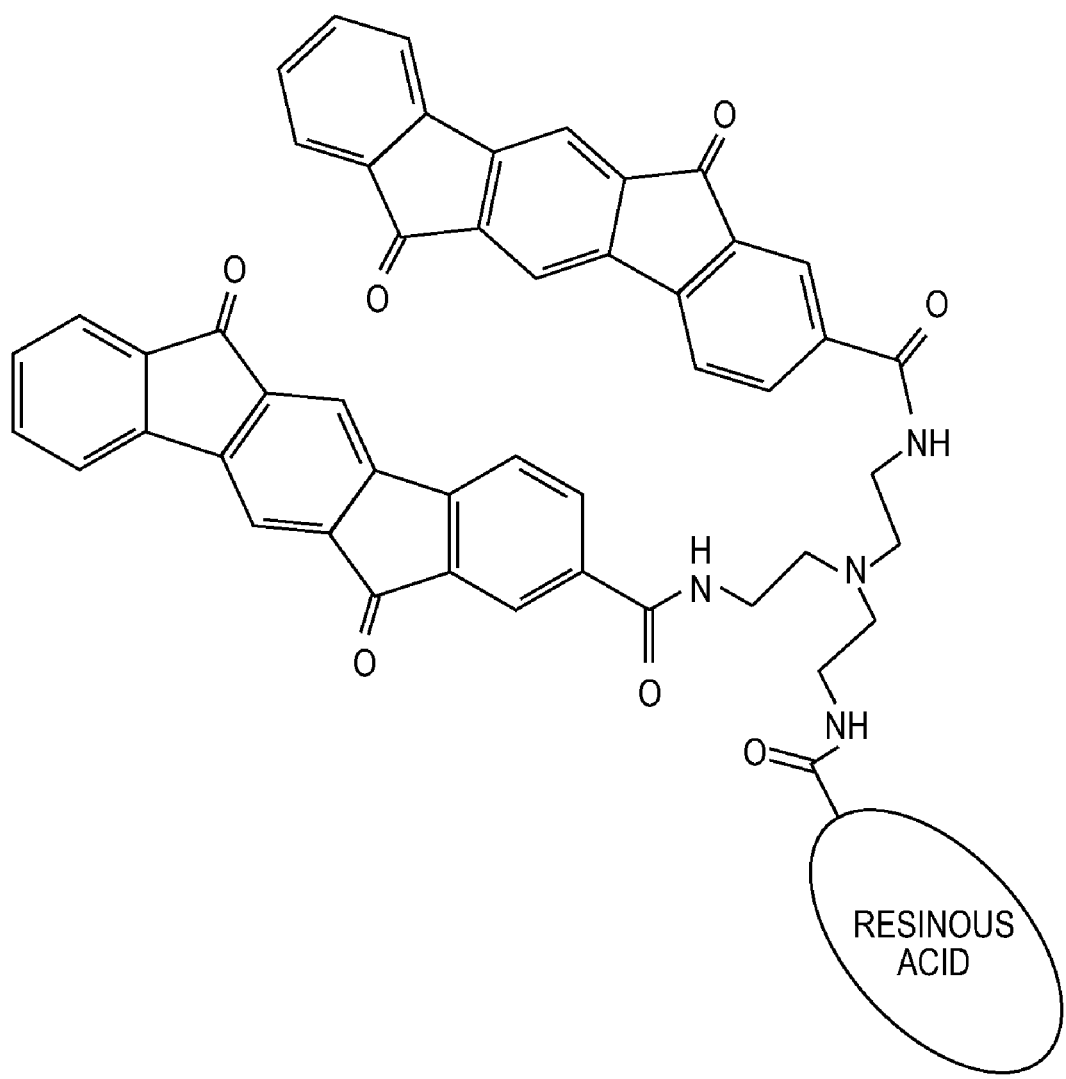
FIG. 2 depicts the generalized structure of a pigment particle comprising two monocarboxylic-indenofluorenone pigments attached to a waxy carboxylic acid and an amine.
Figure 3:
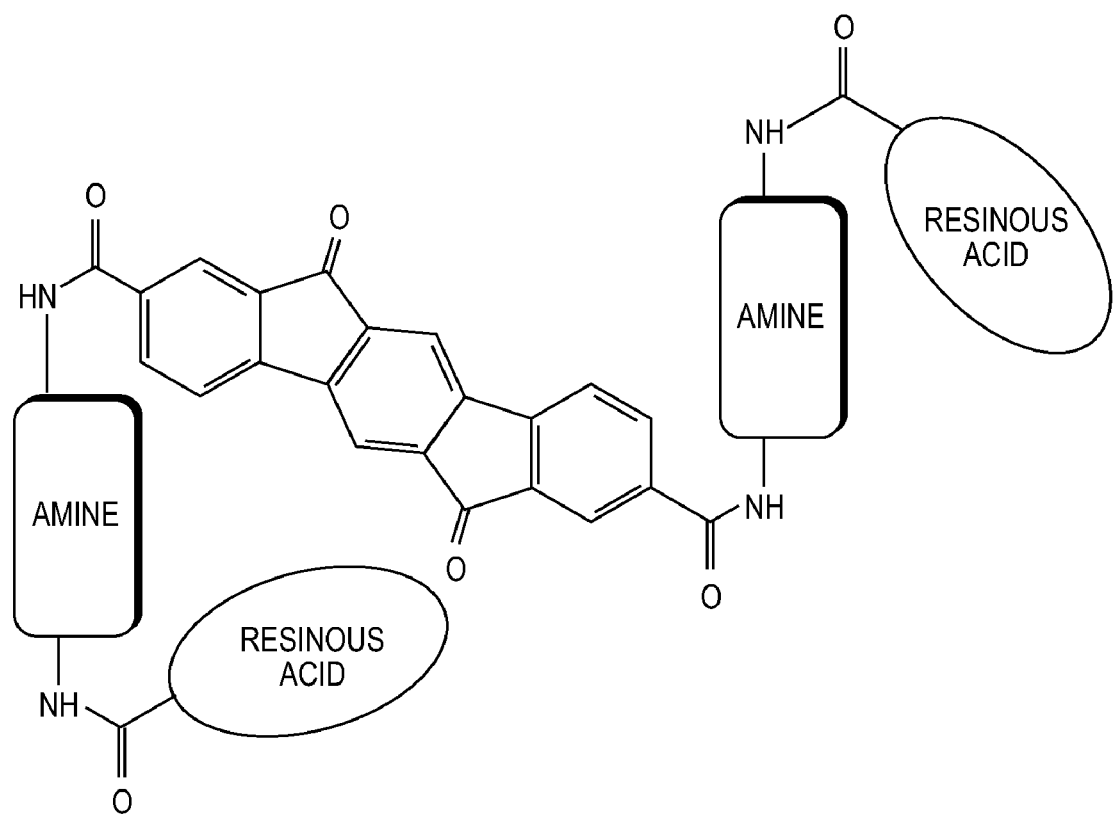
FIG. 3 depicts the generalized structure of a pigment particle comprising a dicarboxylic-indenofluorenone pigment attached to waxy carboxylic acids and amines.

| Indenofluorenone Pigment | Stabilizing Resin Components | | Generalized Structure |
|---|---|---|---|
| | Waxy Carboxylic Acid | Amine | |
| 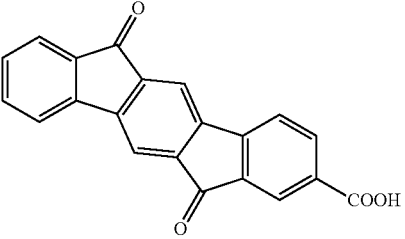 | UNICID ® 700, UNICID ® 350, UNICID ® 425, UNICID ® 550, hexadecanoic acid, heptadecanoic acid, octadecanoic acid, eicosanoic acid, docosanoic acid, tetracosanoic acid, hexacosanoic acid, heptacosanoic acid, octacosanoic acid, triacontanoic acid, dotriacontanoic acid, tritriacontanoic acid tetratriacontanoic acid, pentatriacontanoic acid, Guerbet acids (16 to 36 carbons), PRIPOL ® 1009 (C-36 dimer acid mixture) | ethylene diamine, propylene diamine, 3,3-diamino-N-methyl-dipropylamine, 1,8-diamino-p-menthane, 1,4 diaminobutane, 1,3-diaminopentane, 1,5-diaminopentane, 1,6-diamonohexane, 1,2-diaminocyclohexane, 1,7-diaminoheptane, 1,8-diaminobutane, 1,10-diaminodecane, 4,4'-diaminobenzanilide, 4,4'-diaminobenzophenone, 2,7-diaminofluorene, 2,4-diaminotoulene, 2,3-diaminotoluene, triethylenetetraamine, tetraethylenepentaamine, ethyleneimine E-100, tris(2-aminoethylamine) | See FIG. 2 |
| 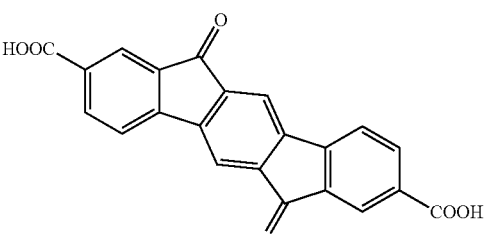 | UNICID ® 700, UNICID ® 350, UNICID ® 425, UNICID ® 550, hexadecanoic acid, heptadecanoic acid, octadecanoic acid, eicosanoic acid, docosanoic acid, tetracosanoic acid, hexacosanoic acid, heptacosanoic acid, octacosanoic acid, triacontanoic acid, dotriacontanoic acid, tritriacontanoic acid tetratriacontanoic acid, pentatriacontanoic acid, Guerbet acids (16 to 36 carbons), PRIPOL ® 1009 (C-36 dimer acid mixture) | ethylene diamine, propylene diamine, 3,3-diamino-N-methyl-dipropylamine, 1,8-diamino-p-menthane, 1,4 diaminobutane, 1,3-diaminopentane, 1,5-diaminopentane, 1,6-diamonohexane, 1,2-diaminocyclohexane, 1,7-diaminoheptane, 1,8-diaminooctane, 1,10-diaminodecane, 4,4'-diaminobenzanilide, 4,4'-diaminobenzophenone, 2,7-diaminofluorene, 2,4-diaminotoulene, 2,3-diaminotoluene, triethylenetetraamine, tetraethylenepentaamine, ethyleneimine E-100, tris(2-aminoethylamine) | See FIG. 3 |

The fluorescent particles described herein may be utilized with any toner within the purview of those skilled in the art. In embodiments, the fluorescent particles described herein may be utilized with conventional toners produced by melt-mixing resins, optionally with colorants, and optionally with waxes, forming agglomerated particles, and grinding or similarly treating the agglomerated particles to form toner particles. In other embodiments, the fluorescent particles described herein may be utilized with toners produced by chemical synthesis methods, including EA toners and toners produced in suspensions, by chemical milling, combinations thereof, and the like.

Emulsion Aggregation Process

Any suitable emulsion aggregation procedure may be modified according to the present disclosure and used in forming the emulsion aggregation toner particles without restriction. These procedures typically include the basic process steps of at least aggregating an emulsion containing polymer binder and one or more optional waxes, one or more colorants, one or more surfactants, a coagulant, and one or more additional optional additives to form aggregates, subsequently coalescing or fusing the aggregates, and then recovering, optionally washing, and optionally drying the obtained emulsion aggregation toner particles.

In embodiments, the final toner particles may be as large as about 20 μm or larger. The final toner particles may also be smaller, such as from about 19 μm to about 2.5 μm, or from about 4.5 μm to about 3 μm. Thus, the particles may be about 19 μm or less, such as about 4.9 μm or less, about 4 μm or less, or about 3 μm or less.

It may be desirable to control the toner particle size and limit the amount of both fine and coarse toner particles in the toner. In an embodiment, the toner particles have a very narrow particle size distribution with a lower number GSD of about 1.15 to about 1.30, or about less than 1.25. The toner particles of the present disclosure also can have a size such that the upper GSD by volume is in the range of from about 1.15 to about 1.30, such as from about 1.18 to about 1.22, or less than about 1.25. These GSD values for the toner particles of the present disclosure indicate that the toner particles are made to have a very narrow particle size distribution.

Suitable emulsion aggregation/coalescing processes for the preparation of toners are illustrated in a number of Xerox patents, the disclosures of each of which are totally incorporated herein by reference, such as U.S. Pat. Nos. 5,290,654; 5,278,020; 5,308,734; 5,370,963; 5,344,738; 5,403,693; 5,418,108; 5,364,729; 5,346,797; 6,627,373; 6,656,657; 6,617,092; 6,638,677; 6,576,389; 6,664,017; 6,656,658; and 6,673,505. Also of interest are U.S. Pat. Nos. 5,348,832; 5,405,728; 5,366,841; 5,496,676; 5,527,658; 5,585,215; 5,650,255; 5,650,256; 5,501,935; 5,723,253; 5,744,520; 5,763,133; 5,766,818; 5,747,215; 5,827,633; 5,853,944; 5,804,349; 5,840,462; 5,869,215; 5,863,698; 5,902,710; 5,910,387; 5,916,725; 5,919,595; 5,925,488; and 5,977,210, the disclosures of each of which are hereby totally incorporated herein by reference. The appropriate components and process aspects of each of the foregoing U.S. patents may be selected for the present composition and process in embodiments thereof.

Resins and Polymers

In embodiments, the fluorescent particle may be used in various toners, for example, polymer toners such as polyester toners and UV curable toners.

Polyester resins are known in the art. The specific polyester resin or resins selected for the present disclosure include, for example, unsaturated polyester and/or its derivatives, polyimide resins, branched polyimide resins, sulfonated polyesters, and any of the various polyesters, such as crystalline polyesters, amorphous polyesters, or a mixture thereof. Thus, for example, the toner particles can be comprised of crystalline polyester resins, amorphous polyester resins, or a mixture of two or more polyester resins where one or more polyester is crystalline and one or more polyester is amorphous. Illustrative examples of such resins may be found, for example, in U.S. Pat. Nos. 6,593,049, 6,756,176, and 6,830,860, the entire disclosures thereof being incorporated herein by reference.

The resin may be a polyester resin formed by reacting a diol with a diacid in the presence of a catalyst. For forming a crystalline polyester, suitable organic dials include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, ethylene glycol, combinations thereof, and the like. The aliphatic diol may be, for example, selected in an amount of from about 40 to about 60 mole percent, in embodiments from about 42 to about 55 mole percent, in embodiments from about 45 to about 53 mole percent, and the alkali sulfa-aliphatic dial can be selected in an amount of from about 0 to about 10 mole percent, in embodiments from about 1 to about 4 mole percent of the resin.

Examples of organic diacids or diesters selected for the preparation of the crystalline resins include oxalic acid, succinic acid, glutaric acid, adipic acid, suberic acid, azelaic acid, fumaric acid, maleic acid, dodecanedioic acid, sebacic acid, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof, and combinations thereof. The organic diacid may be selected in an amount of, for example, in embodiments from about 40 to about 60 mole percent, in embodiments from about 42 to about 55 mole percent, in embodiments from about 45 to about 53 mole percent.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), polypropylene-succinate), poly(butylene-succinate), poly(pentylene-succinate), poly(hexylenesuccinate), poly(octylene-succinate), poly(ethylene-sebacate), poly(propylene-sebacate), poly(butylene-sebacate), poly(pentylene-sebacate), poly(hexylene-sebacate), poly(octylene-sebacate), alkali copoly(5-sulfoisophthaloyl)-copoly(ethylene-adipate), poly(decylene-sebacate), pol(decylene-decanoate), poly-(ethylene-decanoate), poly-(ethylene-dodecanoate), poyl(nonylene-sebacate), poly (nonylene-decanoate), copoly(ethylene-fumarate)-copyly(ethylene-sebacate), copoly(ethylene-fumarate)-copyly(ethylene-decanoate), and copoly(ethylene-fumarate)-copyly(ethylene-dodecanoate), and combinations thereof.

The crystalline resin may be present, for example, in an amount of from about 5 to about 50 percent by weight of the toner components, in embodiments from about 10 to about 35 percent by weight of the toner components. The crystalline resin can possess various melting points of, for example, from about 30° C. to about 120° C., in embodiments from about 50° C. to about 90° C. The crystalline resin may have a number average molecular weight ($M_n$), as measured by gel permeation chromatography (GPC) of, for example, from about 1,000 to about 50,000, in embodiments from about 2,000 to about 25,000, and a weight average molecular weight ($M_w$) of, for example, from about 2,000 to about 100,000, in embodiments from about 3,000 to about 80,000, as determined by Gel Permeation Chromatography using polystyrene standards. The molecular weight distribution ($M_w/M_n$) of the crystalline resin may be, for example, from about 2 to about 6, in embodiments from about 3 to about 4.

Examples of diacid or diesters selected for the preparation of amorphous polyesters include dicarboxylic acids or diesters such as terephthalic acid, phthalic acid, isophthalic acid, fumaric acid, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacid or diester may be present, for example, in an amount from about 40 to about 60 mole percent of the resin, in embodiments from about 42 to about 55 mole percent of the resin, in embodiments from about 45 to about 53 mole percent of the resin.

Examples of dials utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, and combinations thereof. The amount of organic dial selected can vary, and may be present, for example, in an amount from about 40 to about 60 mole percent of the resin, in embodiments from about 42 to about 55 mole percent of the resin, in embodiments from about 45 to about 53 mole percent of the resin.

Polycondensation catalysts which may be utilized for either the crystalline or amorphous polyesters include tetraalkyl titanates such as titanium (iv) butoxide or titanium (iv) iso-propoxide, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.001 mole percent to about 0.55 mole percent based on the starting diacid or diester used to generate the polyester resin.

In embodiments, suitable amorphous resins include polyesters, polyamides, polyimides, polyolefins, polyethylene, polybutylene, polyisobutyrate, ethylene-propylene copolymers, ethylene-vinyl acetate copolymers, polypropylene, combinations thereof, and the like. Examples of amorphous resins which may be utilized include alkali sulfonated-polyester resins, crosslinked, for example, from about 10 percent to about 70 percent, branched alkali sulfonated-polyester resins, alkali sulfonated-polyimide resins, branched alkali sulfonated-polyimide resins. Alkali sulfonated polyester resins may be useful in embodiments, such as the metal or alkali salts of copoly(ethylene-terephthalate)-copoly(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfoisophthalate), copoly(propylene-butylene-terephthalate)-copoly(propylene-butylene-5-sulfo-isophthalate), and copoly(propoxylated bisphenol-A-fumarate)-copoly(propoxylated bisphenol A-5-sulfo-isophthalate).

In embodiments, an unsaturated polyester resin may be utilized as a latex resin. Examples of such resins include those disclosed in U.S. Pat. No. 6,063,827, the disclosure of which is hereby incorporated by reference in its entirety. Exemplary unsaturated polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

In embodiments, a suitable amorphous polyester resin may be a poly(propoxylated bisphenol A co-fumarate) resin having the following formula (I):

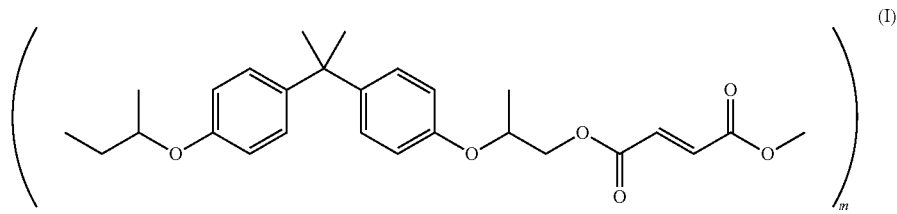

wherein m may be from about 5 to about 1000.

An example of a linear propoxylated bisphenol A fumarate resin which may be utilized as a latex resin is available under the trade name SPARII from Resana S/A Industrias Quimicas, Sao Paulo Brazil. Other propoxylated bisphenol A fumarate resins that may be utilized and are commercially available include GTUF and FPESL-2 from Kao Corporation, Japan, and EM181635 from Reichhold, Research Triangle Park, North Carolina and the like.

Suitable crystalline resins include those disclosed in U.S. Patent Application Publication No. 2006/0222991, the disclosure of which is hereby incorporated by reference in its entirety. In embodiments, a suitable crystalline resin may be composed of ethylene glycol and a mixture of dodecanedioic acid and fumaric acid co-monomers with the following formula:

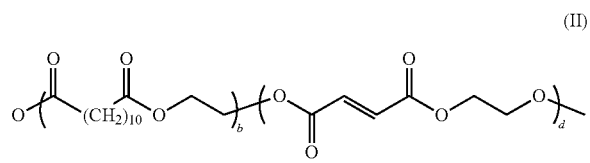

wherein b is from about 5 to about 2000 and d is from about 5 to about 2000.

One, two, or more toner resins/polymers may be used. In embodiments where two or more toner resins are used, the toner resins may be in any suitable ratio (e.g., weight ratio) such as for instance about 10% first resin:90% second resin to about 90% first resin:10% second resin. In embodiments, the amorphous resin utilized in the core may be linear.

UV curable resins are also known in the art. In embodiments, UV curable resins may be unsaturated polymers that can be crosslinked in the presence of activating radiation such as ultraviolet light and a suitable photo initiator. Illustrative examples of such resins and initiators may be found, for example, in U.S. Patent Application Publication No. 2008-0199797, the entire disclosure thereof being incorporated herein by reference.

In embodiments, the resin may be formed by emulsion polymerization methods. In other embodiments, a pre-made resin may be utilized to form the toner.

In embodiments, the resin may be added as an emulsion, such as a solvent-phase inversion emulsion or a solvent-free emulsion prepared by solvent-free resin emulsification.

Surfactants

In embodiments, an optional surfactant may be used. The surfactant may be added to the resin to form an emulsion and/or may be added to the slurry to help facilitate dispersion of the various components.

One, two, or more surfactants may be utilized. The surfactants may be selected from ionic surfactants and nonionic surfactants. Anionic surfactants and cationic surfactants are encompassed by the term "ionic surfactants." In embodiments, the surfactant may be utilized so that it is present in an amount of from about 0.01% to about 10% by weight of the toner composition, for example from about 0.75% to about 7% by weight of the toner composition, in embodiments from about 1% to about 5% by weight of the toner composition. Thus, the surfactant can be absent or can be present in amounts of from about zero to about 15 pph, based on dry resins in the toner, for example from about zero to about 4 pph, from about 4 to about 9 pph, or from about 4 to about 6 pph.

Examples of nonionic surfactants that can be utilized include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants include a block copolymer of polyethylene oxide and polypropylene oxide, including those commercially available as SYNPERONIC PE/F, in embodiments SYNPERONIC PE/F 108.

Anionic surfactants that may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Waxes

Conventionally, wax is added to a toner formulation in order to aid toner release from the fuser roll, particularly in low oil or oil-less fuser designs. For EA toners, for example styrene-acrylate EA toners, it has been conventional to add linear polyethylene waxes such as the POLYWAX® line of waxes available from Baker Petrolite to the toner composition. In the present toner composition, the fluorescent pigment particle comprising the stabilizing wax discussed above provides both fluorescent properties as well as replaces some or all the aliphatic wax conventionally used in toners for oil-less printing. Thus, in some embodiments, the stabilizing wax chemically attached to the fluorescent pigment is the only wax present in the toner particles.

However, in other embodiments, in addition to the polymer binder resin, the toners of the present disclosure may also contain a wax, either a single type of wax or a mixture of two or more preferably different waxes. A single wax can be added to toner formulations, for example, to improve particular toner properties, such as toner particle shape, presence and amount of wax on the toner particle surface, charging and/or fusing characteristics, gloss, stripping, offset properties, and the like. Alternatively, a combination of waxes can be added to provide multiple properties to the toner composition. The wax can also be any of the waxes described above for the stabilizing wax, although not chemically attached to the fluorescent pigment.

Suitable examples of waxes include waxes selected from natural vegetable waxes, natural animal waxes, mineral waxes, synthetic waxes and functionalized waxes. Examples of natural vegetable waxes include, for example, carnauba wax, candelilla wax, rice wax, sumacs wax, jojoba oil, Japan wax, and bayberry wax. Examples of natural animal waxes include, for example, beeswax, panic wax, lanolin, lac wax, shellac wax, and spermaceti wax. Mineral-based waxes include, for example, paraffin wax, microcrystalline wax, montan wax, ozokerite wax, ceresin wax, petrolatum wax, and petroleum wax. Synthetic waxes include, for example, Fischer-Tropsch wax; acrylate wax; fatty acid amide wax; silicone wax; polytetrafluoroethylene wax; polyethylene wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, dipropyleneglycol distearate, diglyceryl distearate, and triglyceryl tetrastearate; sorbitan higher fatty acid ester waxes, such as sorbitan monostearate; and cholesterol higher fatty acid ester waxes, such as cholesteryl stearate; polypropylene wax; and mixtures thereof.

Examples of waxes of embodiments include polypropylenes and polyethylenes commercially available from Allied Chemical and Baker Petrolite (for example POLYWAX™ polyethylene waxes from Baker Petrolite), wax emulsions available from Michelman Inc. and the Daniels Products Company, EPOLENE N-15 commercially available from Eastman Chemical Products, Inc., VISCOL 550-P, a low weight average molecular weight polypropylene available from Sanyo Kasei K.K., and similar materials. The commercially available polyethylenes usually possess a molecular weight Mw of from about 500 to about 2,000, such as from about 1,000 to about 1,500, while the commercially available polypropylenes utilized have a molecular weight of about 1,000 to about 10,000. Examples of functionalized waxes include amines, amides, imides, esters, quaternary amines, carboxylic acids or acrylic polymer emulsion, for example, JONCRYL 74, 89, 130, 537, and 538, all available from Johnson Diversey, Inc., chlorinated polypropylenes and polyethylenes commercially available from Allied Chemical and Petrolite Corporation and Johnson Diversey, Inc. Many of the polyethylene and polypropylene compositions useful in embodiments are illustrated in British Pat. No. 1,442,835, the entire disclosure of which is incorporated herein by reference.

The toners may contain the wax in any amount of from, for example, about 1 to about 25 percent by weight of toner, such as from about 3 to about 15 percent by weight of the toner, on a dry basis; or from about 5 to about 20 percent by weight of the toner, such as from about 5 to about 11 percent weight of the toner.

Coagulants

The emulsion aggregation process for making toners of the present disclosure also contains at least a coagulant, such as a monovalent metal coagulant, a divalent metal coagulant, a polyion coagulant, or the like. A variety of coagulants are known in the art, as described above. As used herein, "polyion coagulant" refers to a coagulant that is a salt or oxide, such as a metal salt or metal oxide, formed from a metal species having a valence of at least 2 to about 11, such as from about 3 to about 7 or from about 4 to about 6. Suitable coagulants thus include, for example, coagulants based on aluminum such as polyaluminum halides such as polyaluminum fluoride and polyaluminum chloride (PAC), polyaluminum silicates such as polyaluminum sulfosilicate (PASS), polyaluminum hydroxide, polyaluminum phosphate, aluminum sulfate, and the like. Other suitable coagulants include, but are not limited to, tetraalkyl titinates, dialkyltin oxide, tetraalkyltin oxide hydroxide, dialkyltin oxide hydroxide, aluminum alkoxides, alkylzinc, dialkyl zinc, zinc oxides, stannous oxide, dibutyltin oxide, dibutyltin oxide hydroxide, tetraalkyl tin, and the like. Where the coagulant is a polyion coagulant, the coagulants may have any desired number of polyion atoms present. For example, suitable polyaluminum compounds in embodiments have from about 2 to about 11, aluminum ions present in the compound.

Such coagulants can be incorporated into the toner particles prior to particle aggregation. As such, the coagulant can be present in the toner particles, exclusive of external additives and on a dry weight basis, in amounts of from 0 to about 5 percent by weight of the toner particles, such as from about greater than 0 to about 3 percent by weight of the toner particles.

Ion Solutions

In embodiments, salts, bases, buffers, and combinations of salts, bases, and buffers may be used to freeze the size of the aggregates.

Suitable salts or bases utilized to increase the pH and hence ionize the aggregate particles thereby providing stability and preventing the aggregates from growing in size include, but are not limited to, metallic salts of aliphatic acids or aromatic acids and bases, such as sodium hydroxide, ammonium hydroxide, sodium tetraborate, cesium hydroxide, potassium acetate, zinc acetate, sodium dihydrogen phosphate, disodium hydrogen phosphate, potassium formate, potassium hydroxide, sodium oxalate, sodium phthalate, potassium salicylate, combinations thereof, and the like.

Suitable buffers may also be used. In embodiments, a buffer system may include at least two of acids, salts, bases, organic compounds, and combinations thereof in a solution with deionized water as the solvent. The bases may be selected from those listed above. Suitable acids that can be utilized include, but are not limited to, organic and/or inorganic nitric acids such as sulfuric acid, hydrochloric acid, acetic acid, citric acid, trifluoro acetic acid, succinic acid, salicylic acid, combinations thereof, and the like. Suitable organic compounds include, but are not limited to, tris(hydroxymethyl)aminomethane ("TRIS"), Tricine, Bicine, Glycine, sodium acetate, HEPES, Triethylamine hydrochloride, MOPS, combinations thereof, and the like.

In embodiments, salts, bases, acids, buffers, and combinations of salts, bases, acids, and buffers may be used to coalesce the particles. Examples of such salts, bases, acids, buffers, and combinations thereof may be found in U.S. patent application Ser. No. 12/056,337, the entire disclosure of which is incorporated herein by reference.

EXAMPLE

All starting materials with the exception of Unicid 700 are purchased from Sigma Aldrich. Unicid 700 is obtained from Baker Petrolite.

Preparation of trans-dicarboxylic-indenofluorenone

A trans-dicarboxylic-indenofluorenone is prepared in three steps starting with commercially available 2,5-dibromo-p-xylene. In the first step, as indicated in Scheme 1 below, a Suzuki type reaction between 2,5-dibromo-p-xylene and p-tolyl-boronic acid is used to prepare Product A. Specifically, in a 250 mL round bottom flask fitted with magnetic stirring, reflux condenser, argon inlet and oil heating bath are introduced 4.07 g (0.029 mol) p-tolyl boronic acid, 4.0 g (0.015 mol) 2,5-dibromo-p-xylene, 9.0 g (0.065 mol) potassium carbonate, 6.0 g (0.035 mol) tetramethyl ammonium bromide and 0.136 g (0.0014 mol) palladium acetate. The solids are flushed with argon for 15 minutes, followed by the addition of 40 mL of distilled water to the reaction mixture. The temperature is raised to 70° C. and the mixture is allowed to heat with stirring for about 4 hours. After 4 hours, the reaction is allowed to cool to room temperature, and another 50 mL of distilled water are introduced into the flask. The dark precipitate formed is isolated from the aqueous mother liquor through filtration using a filter paper. The solid is further dissolved in toluene, a spatula of decolorizing charcoal is added to the solution and everything is heated to boil. The black residue is removed through filtration. The aqueous mother liquor is extracted twice with 40 mL dichloromethane and once with 40 mL toluene. The organic layers are combined and dried over anhydrous magnesium sulfate. Finally, the solvent is removed in vacuum to afford 4.11 g (94%) of a white solid.

Product A is prepared according to Scheme 1.

Scheme 1. Preparartion of Product A using a Suzuki coupling method

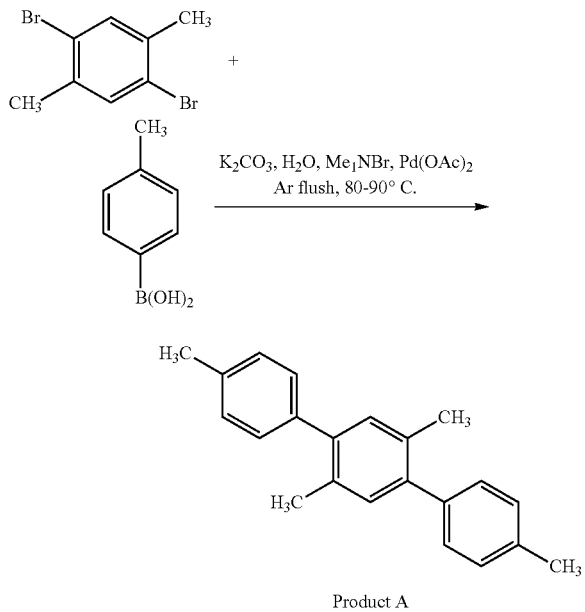

Product A

In the second step, as indicated in Scheme 2 below, Product A is oxidized in the presence of potassium permanganate and pyridine to afford a tetracarboxylic acid derivative (Product B). Specifically, Product A (1.23 g, 0.0043 mol) is dissolved in 30 mL of pyridine and introduced into a 1 L round bottom flask fitted with magnetic stirring, reflux condenser and oil heating bath. Potassium permanganate (28 g, 0.177 mol) is introduced in portions of 2 to 3 g in 10 mL of distilled water over a period of 96 hours. During this time, the temperature in the reaction flask is maintained around 100° C. When the reaction is judged as complete, the resulted manganese dioxide is separated through filtration. The manganese dioxide is stirred in hot water (100 mL at 80° C.) and filtered. The two liquids are combined and acidified with hydrochloric acid up to a pH of 2. After a white solid appears, the solid is filtered using a glass frit and dried in a vacuum oven at 130° C. for 2 hours. The product is obtained as a white solid (1.385 g, 79%). $H^1$ NMR in DMSO-$d_6$: δ (ppm): 7.5 (d, J=7.8 Hz, 2H), 7.7 (s, 1H), 7.9 (d, J=8.1 Hz, 2H).

Product B is prepared according to Scheme 2.

Scheme 2. Preparation of a tetracarboxylic derivative (Product B) through oxidation

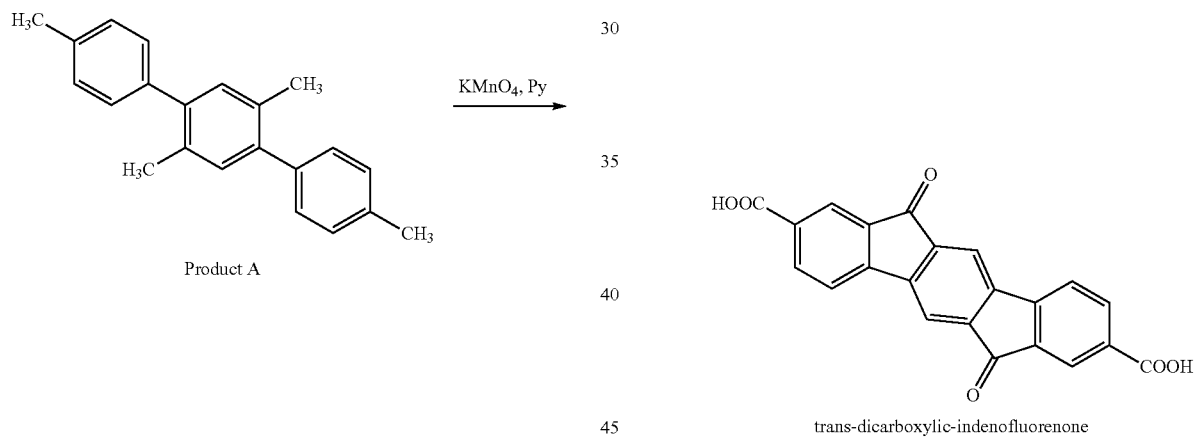

Product A

KMnO$_4$, Py

Product B

In the third step, as indicated in Scheme 3 below, the trans-dicarboxylic-indenofluorenone is obtained through acid catalyzed cyclization in the presence oleum 7%. Specifically, in a 100 mL round bottom flask fitted with magnetic stirring, oil heating bath and reflux condenser are introduced Product B (1.2 g, 0.003 mol) and 7 mL of oleum 7%. The temperature is raised to 100° C. and the resulting brown solution is heated for 4 hours. The solution is allowed to cool to room temperature and poured in 100 mL distilled water. The resulting red precipitate is isolated through filtration using a glass frit and dried in a vacuum oven at 130° C. for 2 hours. The product is obtained as a purple solid (1.0 g, 92%).

The trans-dicarboxylic-indenofluorenone is prepared according to Scheme 3.

Scheme 3. Preparation of trans-dicarboxylic-indenofluorenone through cyclizaton

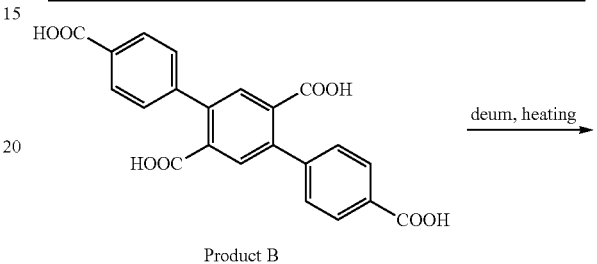

Product B oleum, heating

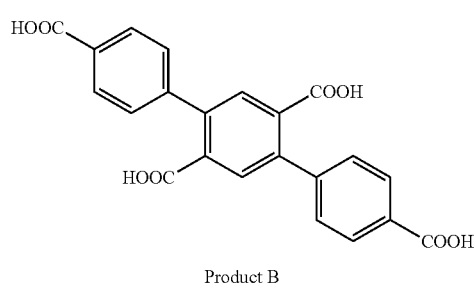

trans-dicarboxylic-indenofluorenone

Preparation of a Stabilizing Wax

As indicated in Scheme 4 below, a stabilizing wax is prepared by reacting UNICID® 700 with ethylene diamine in a 1 to 1 ratio. Specifically, in a 1 L resin kettle fitted with heating mantle, mechanical stirring, Dean-Stark trap, reflux condenser and temperature sensor are introduced 144.59 g UNICID® 700 resin and 9.02 g 1,2-ethylenediamine (Aldrich). Under a stream of Argon, the temperature in the kettle is raised to 90° C. and the resin is allowed to melt. When the resin is completely melted, the temperature is gradually raised to 180° C. with stirring, and the reaction is allowed to proceed for 3 hours. Water (2.7 ml) is collected into the Dean-Stark trap. After 3 hours of reaction at 180° C., the kettle is emptied warm. The product is obtained as a beige resin (145 g, 96%).

The stabilizing wax is prepared according to Scheme 4.

Scheme 4. Preparation of a stabilizing wax

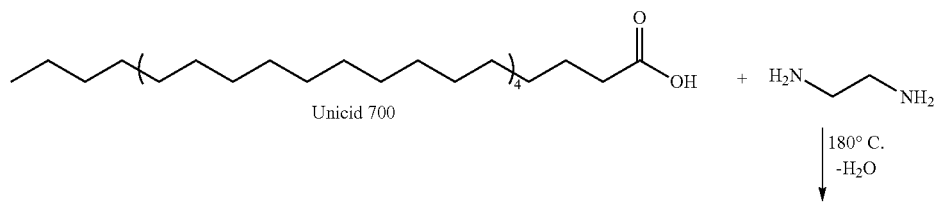

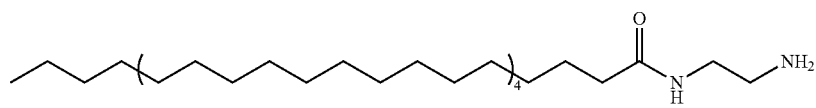

Preparation of Modified Amide Type Trans-Dicarboxylic-Indenofluorenone (Hereinafter "Red Resin")

As indicated in Scheme 5 below, the red resin is prepared by chemically attaching the fluorescent compound with a stabilizing wax in a high boiling solvent. Specifically, in a 150 mL resin kettle fitted with heating mantle, magnetic stirring, Dean-Stark trap, reflux condenser and temperature sensor are introduced 1.0 g (0.0027 mol) trans-dicarboxylic-indenofluorenone, 6.036 g (0.0078 mol) stabilizing wax and 20 mL of toluene. Under a stream of Argon, the temperature in the kettle is raised to 110° C. and the resin is allowed to melt. The reaction is allowed to proceed for 18 hours, after which the toluene is flushed off and the temperature is raised to 140° C. The reaction is allowed to proceed for 3 hours, after which the kettle is emptied warm. The product is obtained as a red fluorescent resin (6.68 g).

The red resin is prepared according to Scheme 5.

Scheme 5. Preparation of red resin

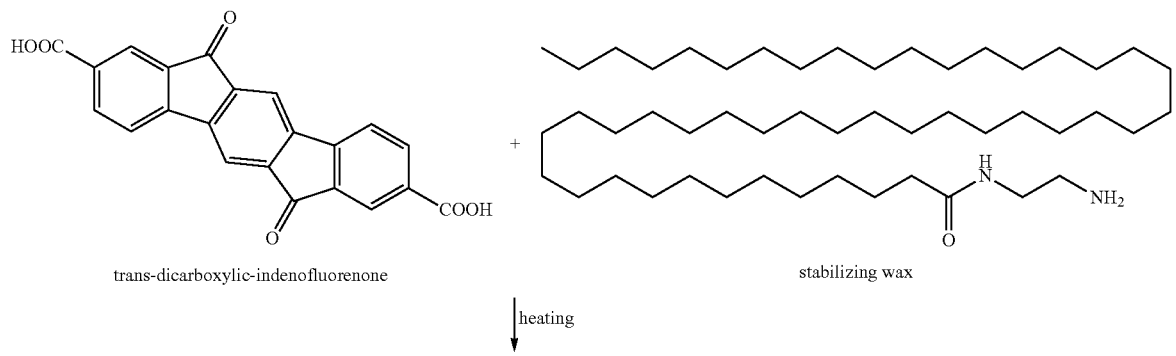

-continued

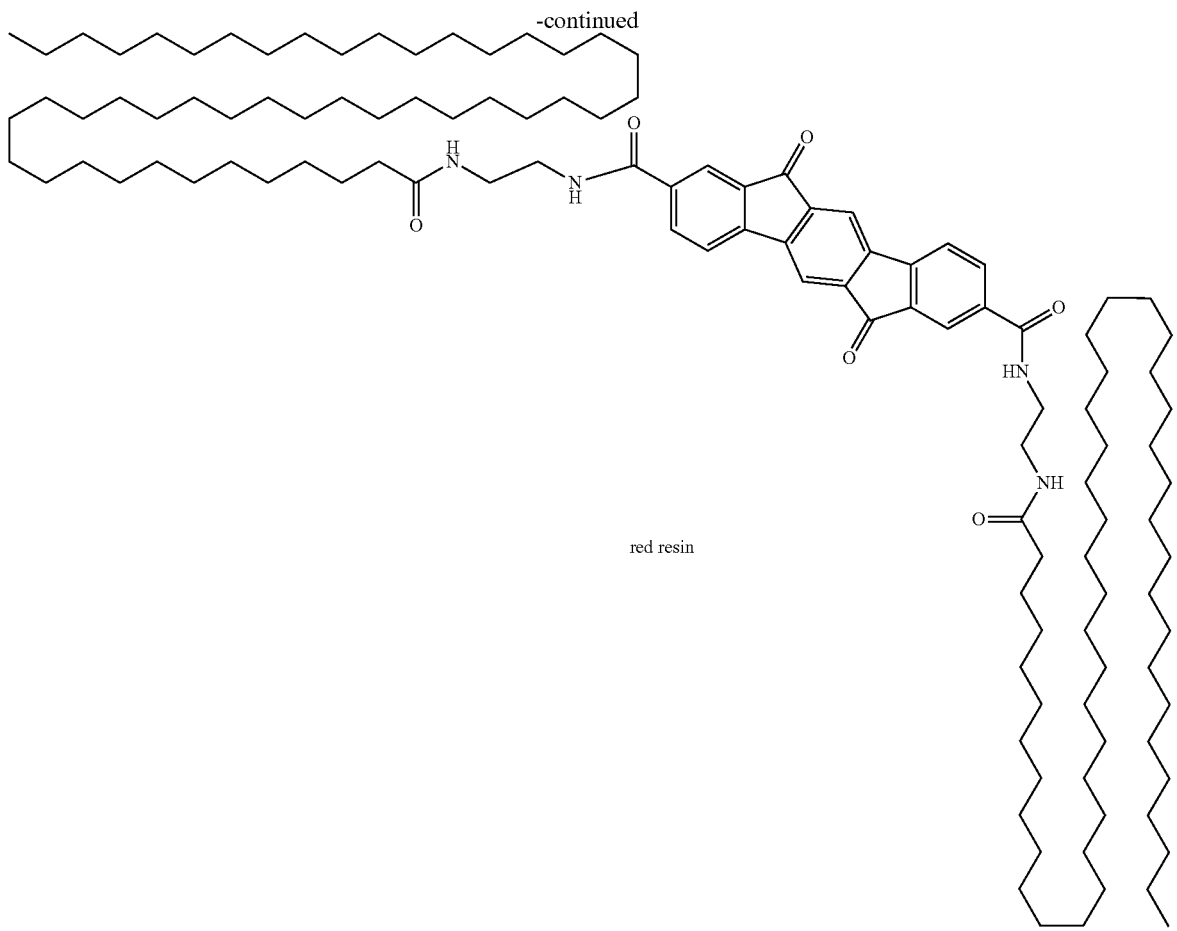

red resin

Synthesis of Aqueous Emulsion of Red Resin

An example of a method for preparing an aqueous emulsion of a wax is illustrated in U.S. Pat. No. 7,560,505, the disclosure of which is totally incorporated herein by reference.

Preparation of Toner Containing 5% by Weight Red Resin 70.87 g of polyester emulsion A (56° C. Tg, 207 nm; 39.16 wt %), 77.93 g of polyester emulsion B (60.5° C. Tg, 215 nm; 35.61 wt %), 23.79 g of crystalline polyester emulsion C (71.04° C. Tm, 151 nm; 31.51 wt %), 2.7 g Dowfax 2A1 and 25 g red resin emulsion (UNICID® wax containing fluorescent dye covalently bonded, 20 wt %), is added to 369.194 g of deionized water in a glass kettle and is homogenized using IKA ULTRA TURRAX T50 homogenizer operating at 4000 rpm. Thereafter, 1.79 g of $Al_2(SO_4)_3$ mixed with 48 g of deionized water as a flocculent is added drop-wise to the kettle and homogenized for 10 minutes. The mixture is degassed for 20 minutes at 280 rpm and then heated at 1° C. per minute to a temperature of 37° C. at 460 rpm for aggregation. The particle size is monitored using a COULTER COUNTER instrument (an instrument that sizes and counts particles in a fluid medium by electronic means), until the particle size reaches 5.0 μm. The shell mixture, 35.75 g of 56° C. Tg FXC-56 emulsion (207 nm; 39.16 wt %), 39.02 g of 60.5° C. Tg FXC-42 emulsion (215 nm; 35.61 wt %), 1.2 g of Dowfax 2A1 and 37 g of deionized water, is immediately introduced into the reaction and allowed to aggregate for another 10-20 minutes at 40° C., 460 rpm. As long as the volume average particle diameter is above 5.7 μm according to the measurement of COULTER COUNTER, the pH of the aggregation slurry is adjusted to 4 by the addition of 4 wt % of NaOH solution, followed by the addition of 3.8 g EDTA and thereafter the rpm is decreased to 190 rpm to freeze the toner aggregation at pH 7.5, maintained via 4 wt % of NaOH solution. After freezing, the toner slurry is heated to coalesce. Toner has a final particle size of 5.7 μm, GSD v/n1.200/1.250, and circularity of 0.970. The toner slurry is then cooled to room temperature, separated by sieving (25 μm), filtration, followed by washing and freeze drying.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A fluorescent particle comprising:
   a fluorescent pigment; and
   at least one stabilizing wax chemically attached to the fluorescent pigment,
   wherein the at least one chemically attached stabilizing wax comprises an amine group at its terminal end and the fluorescent pigment comprises at least one carboxylic acid group.

2. The fluorescent particle of claim 1, wherein the at least one stabilizing wax is chemically attached to the fluorescent pigment by the amine group reacting with the at least one carboxylic acid group to form an amide bond.

3. The fluorescent particle of claim 1, wherein the fluorescent pigment is a carboxylic-indenofluorenone.

4. The fluorescent particle of claim 1, wherein the fluorescent pigment is a trans-dicarboxylic-indenofluorenone.

5. A fluorescent particle comprising:
   a fluorescent pigment; and
   at least one stabilizing wax chemically attached to the fluorescent pigment,
   wherein the at least one chemically attached stabilizing wax is formed by reacting a carboxylic acid-terminated polyethylene wax with a diamine.

6. The fluorescent particle of claim 5, wherein the carboxylic acid-terminated polyethylene wax has the structure $CH_3-(CH_2)_n-COOH$, where n=10 to 60.

7. The fluorescent particle of claim 5, wherein the diamine is selected from the group consisting of ethylene diamine and propylene diamine.

8. A method for making a fluorescent particle, comprising chemically attaching at least one stabilizing wax to a fluorescent pigment, wherein the at least one stabilizing wax comprises an amine group at its terminal end and the fluorescent pigment comprises at least one carboxylic acid group.

9. The method of claim 8, wherein the at least one stabilizing wax is chemically attached to the fluorescent pigment by the amine group reacting with the at least one carboxylic acid group to form an amide bond.

10. The method of claim 8, wherein the at least one chemically attached stabilizing wax is formed by reacting a carboxylic acid-terminated polyethylene wax with a diamine.

11. The method of claim 10, wherein the diamine is selected from the group consisting of ethylene diamine and propylene diamine.

12. The method of claim 8, wherein the fluorescent pigment is a carboxylic-indenofluorenone.

13. A toner composition comprising:
    a resin; and
    a fluorescent particle, wherein the fluorescent particle comprises a fluorescent pigment, and at least one stabilizing wax chemically attached to the fluorescent pigment.

14. The toner composition of claim 13, wherein the fluorescent pigment is a carboxylic-indenofluorenone.

15. The toner composition of claim 13, wherein the toner is made by an emulsion aggregation process.

* * * * *